US012581225B2

(12) United States Patent
Fan

(10) Patent No.: US 12,581,225 B2
(45) Date of Patent: Mar. 17, 2026

(54) CHARGING BOX FOR EARPHONES

(71) Applicant: Harman International Industries, Incorporated, Stamford, CT (US)

(72) Inventor: Linyong Fan, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 181 days.

(21) Appl. No.: 18/105,022

(22) Filed: Feb. 2, 2023

(65) Prior Publication Data

US 2023/0188883 A1 Jun. 15, 2023

Related U.S. Application Data

(63) Continuation of application No. PCT/CN2020/109186, filed on Aug. 14, 2020.

(51) Int. Cl.

| | |
|---|---|
| ***H04R 1/10*** | (2006.01) |
| ***G08B 21/02*** | (2006.01) |
| ***H04R 1/1025*** | (2026.01) |

(52) U.S. Cl.

CPC ........... *H04R 1/1025* (2013.01); *G08B 21/02* (2013.01); *H04R 1/1083* (2013.01); *H04R 2420/07* (2013.01)

(58) Field of Classification Search

CPC ..... H04R 1/1025; H04R 1/1083; G08B 21/02

See application file for complete search history.

(56) References Cited

U.S. PATENT DOCUMENTS

| | | | | |
|---|---|---|---|---|
| 10,224,019 | B2 * | 3/2019 | Mitchell | G10K 11/17837 |
| 10,405,082 | B2 * | 9/2019 | Usher | H04R 1/1083 |
| 10,687,135 | B1 | 6/2020 | Palupunoori et al. | |
| 2014/0241540 | A1 * | 8/2014 | Hodges | H04M 1/6066 381/74 |
| 2015/0215701 | A1 * | 7/2015 | Usher | H04R 1/1041 381/71.6 |
| 2019/0278556 | A1 | 9/2019 | Usher et al. | |

(Continued)

FOREIGN PATENT DOCUMENTS

| | | |
|---|---|---|
| CN | 101529876 | 9/2009 |
| CN | 102625219 | 8/2012 |

(Continued)

OTHER PUBLICATIONS

International Search Report issued in corresponding International Application PCT/CN2020/109186, mailed May 13, 2021.

(Continued)

*Primary Examiner* — Rasha S Al Aubaidi

(74) *Attorney, Agent, or Firm* — Burris Law, PLLC

(57) ABSTRACT

A charging box for wireless earphones includes a battery; a plurality of contacts configured to be in contact with the wireless earphones when the wireless earphones are provided in the charging box; a charging circuit configured to electrically couple the battery to the plurality of contacts for charging the wireless earphones; an audio sensor configured to sense environment sounds and provide signals representative of the environment sounds; a processor configured to receive and process the signals and send information to the wireless earphones when the processor determines that the environment sounds contains predefined sounds.

17 Claims, 6 Drawing Sheets

(56) References Cited

U.S. PATENT DOCUMENTS

| | | | | |
|---|---|---|---|---|
| 2020/0204898 A1 | | 6/2020 | Schoeck et al. | |
| 2023/0085975 A1* | | 3/2023 | Ohta ..................... | G01M 17/08 701/19 |

FOREIGN PATENT DOCUMENTS

| | | |
|---|---|---|
| CN | 105282654 | 1/2016 |
| CN | 109361984 | 2/2019 |
| CN | 109429132 | 3/2019 |
| CN | 109688504 | 4/2019 |
| CN | 109688506 | 4/2019 |
| CN | 110147557 | 8/2019 |
| CN | 110691294 | 1/2020 |
| CN | 111246039 | 6/2020 |
| CN | 111464902 | 7/2020 |

OTHER PUBLICATIONS

European Search Report issued in corresponding EP Application 20949137.2, issued Mar. 13, 2024, 8 pages.

Harvey, Hearing Aids Second Edition, 2012, Chapter 3, Hearing Aid Systems, pp. 4, 50-55, 64-67, 75-77, 336 and 430, Boomerang Press, Sydney, and Thieme, New York and Stuttgart.

Office Action issued in corresponding CN Application 202080104002.9, issued Aug. 1, 2024, 10 pages.

* cited by examiner

CHARGING BOX FOR EARPHONES

CROSS-REFERENCE TO RELATED APPLICATIONS

This application is a continuation of International Application No. PCT/CN2020/109186, filed on Aug. 14, 2020. The disclosure of the above application is incorporated herein by reference.

FIELD

The present disclosure relates to a charging box for earphones, and more particularly to a charging box for earphones, which can provide alerts to the user of the earphones. This disclosure also relates to a charging box kit including a charging box and earphones. This disclosure also relates to a method for notifying a user of earphones.

BACKGROUND

The statements in this section merely provide background information related to the present disclosure and may not constitute prior art.

Currently, in-ear earphones and active noise cancellation (ANC) earphones are popular because they can reduce or shield most environment sounds from being heard so that the user of the earphones can enjoy music in a relatively noisy environment. However, such earphones may also shield some useful or important environment sounds that the user of the earphones should be aware of. For example, if the shielded sound is an alert sound or a bell ringing, the wearer of the earphones may be unaware of something happening nearby.

Furthermore, a charging box is employed for charging and holding wireless earphones while the earphones are not in use. However, most of the current charging boxes have the basic functions of charging and holding the wireless earphones.

These issues with wireless in-ear earphones and ANC earphones, among other issues, are addressed by the present disclosure.

SUMMARY

This section provides a general summary of the disclosure and is not a comprehensive disclosure of its full scope or all of its features.

According to one aspect of the disclosure, a charging box for wireless earphones includes: a battery; a plurality of contacts configured to be in contact with the wireless earphones when the wireless earphones are provided in the charging box; a charging circuit configured to electrically couple the battery to the plurality of contacts for charging the wireless earphones; an audio sensor configured to sense environment sounds and provide signals representative of the environment sounds; a processor configured to receive and process the signals and send information to the wireless earphones when the processor determines that the environment sounds contains predefined sounds.

Optionally, the predefined sounds are selected from a group consisting of a car horn sound, a doorbell ringing sound, an alarm sound, and a beeping sound.

Optionally, the charging box further comprises a Bluetooth communication interface, and wherein the information is sent to the earphones via the Bluetooth communication interface.

Optionally, the processor is configured to perform a Natural Language Processing algorithm to determine whether the environment sound includes the one or more predefined sounds.

Optionally, the processor is a system on chip (SoC)-type processor including a Bluetooth low energy interface.

Optionally, the one or more predefined sounds are sound samples that are pre-stored in the charging box.

Optionally, the processor sends the information directly to the earphones.

Optionally, the processor sends the information to a mobile phone, and in response to receiving the information, the mobile phone sends the information to the earphone.

According to another aspect of the disclosure, a charging box kit includes a charging box and a pair of wireless earphones configured to be provided in the charging box.

Optionally, the pair of wireless earphones are in-ear earphones or automatic noise cancelling earphones.

Optionally, the wireless earphones are configured to generate an alert sound in response to receiving the information from the charging box.

Optionally, the earphones comprises: a second audio sensor configured to sense the environment sounds and provide second signals representative of the environment sounds; and a second processor configured to receive and process the second signals upon receipt of the information from the charging box, and the wireless earphones are configured to generate an alert sound when the second processor of the earphones determines that the environment sounds includes the predefined sounds.

According to another aspect of the disclosure, a method for notifying a wearer of earphones is includes: providing the charging box kit; receiving, using the audio sensor of the charging box, the environment sounds and generating the signals representative of the environment sounds; receiving and processing, using the processor of the charging box, the signals representative of the environment sounds; sending an information to the wireless earphones when the processor of the charging box determines that the environment sounds contains predefined sounds; and generating sound in the wireless earphones to notify the user of the earphones an existence of the predefined sound from among the environment sounds.

Optionally, the method further comprises the steps of: receiving the environment sounds and generating signals representative of the environment sounds by using a second audio sensor of the earphones after the receipt of the information from the charging box; and receiving and processing the signals representative of the environment sounds by using a second processor of the earphones.

Other systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
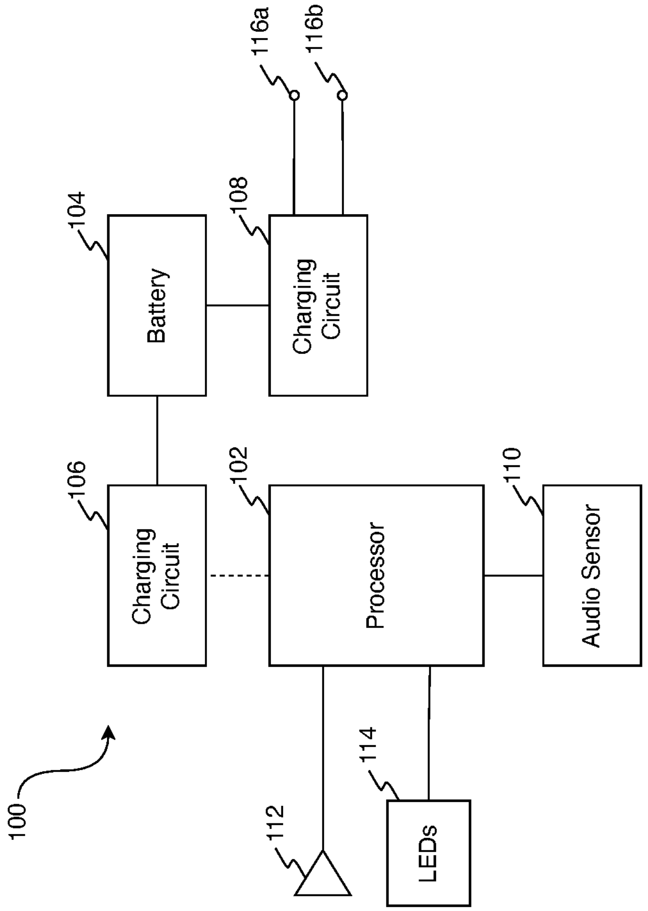
FIG. 1 is a block diagram showing the structure of a charging box for wireless earphones according to one embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc., may be used herein to describe various elements, components, steps or calculations, these elements, components, steps or calculations should not be limited by these terms, rather these terms are only used to distinguish one element, component, step or calculation from another. For example, a first component could be termed a second component, similarly a first calculation could be termed a second calculation; similarly a first step could be termed a second step; all without departing from the scope of this disclosure.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions provided herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements, which may also include, in combination, additional elements not listed.

FIG. 1 is a block diagram showing the structure of a charging box 100 for wireless earphones according to one embodiment of the present disclosure. As shown in FIG. 1, the charging box 100 comprises a processor 102, a battery 104, charging circuits 106, 108, an audio sensor 110, and light-emitting diodes (LEDs) 114. The charging circuit 106 is configured to electrically couple the battery 104 to an external power supply, such as a portable power source, a DC power source etc., so as to charge the battery 104 by using the power supplied from the external power supply. The charging circuit 108 is configured to electrically couple the battery 104 to a pair of contacts 116*a*, 116*b*, which are configured to be in contact with charging contacts of wireless earphones when the wireless earphones are positioned in place in the charging box. The charging circuit 108 includes a boost converter that is configured to boost the voltage of the battery 104 so that it can charge the wireless earphones held in the charging box via the contacts 116*a*, 116*b*. The processor 102 can control the charging process of the charging circuit 106 and the charging circuit 108. The LEDs 114 are configured to indicate the status of the charging box. The charging operation of a charging box 100 is well known in the art, and the detailed description of the charging operation is omitted for the sake of brevity.

The audio sensor 110 is configured to sense and receive environment sounds and generate signals representative of the environment sounds. The processor 102 is configured to receive the signals representative of the environment sound from the audio sensor 110, and the processor 102 is configured to process the received signals to determine whether the environment sounds comprise certain types of predefined sounds. The predefined sounds can be certain, useful, or other types of sounds that the wearer of the earphones should be aware of, such as the sound of a doorbell ringing, an alarm sound, a beep, a car horn, or other types of sounds.

Figure 2:
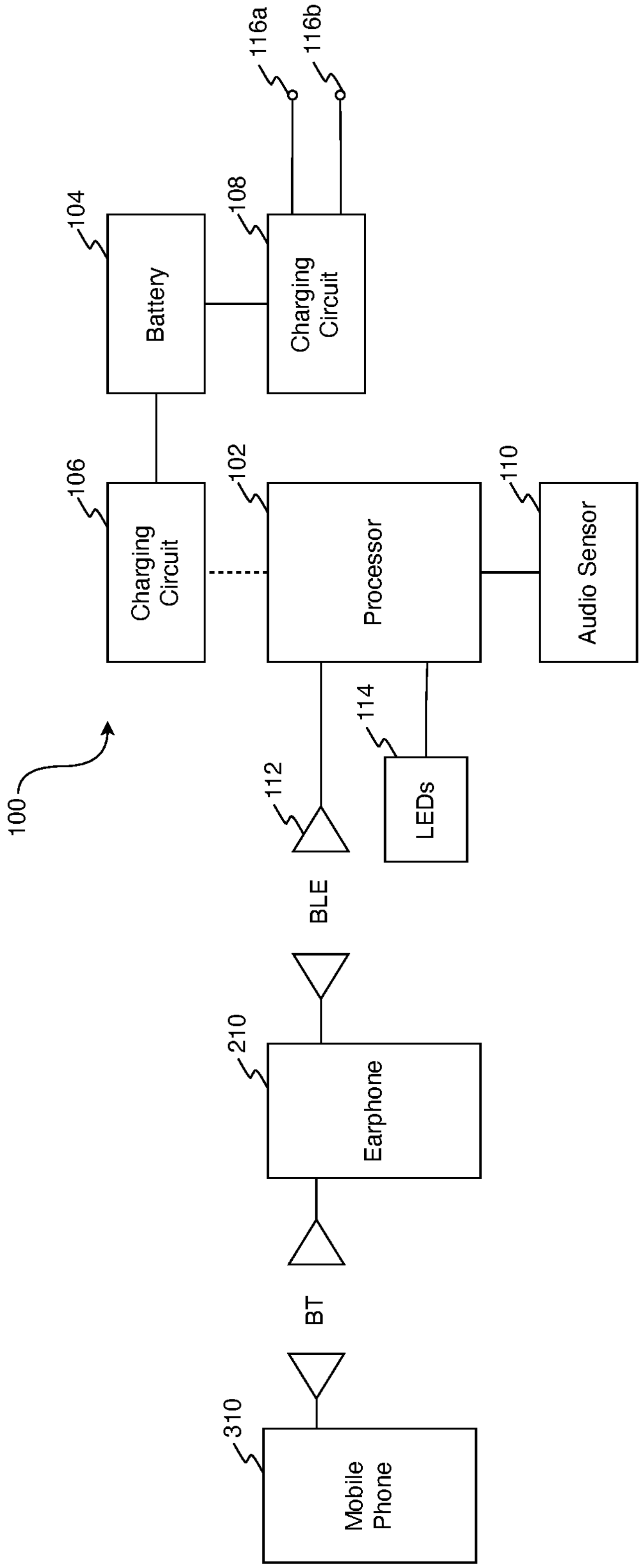
FIG. 2 shows an example embodiment of the connection between the charging box of the present disclosure and earphones and mobile phone according to one embodiment of the present disclosure.

FIG. 2 shows an example embodiment of the connection between the charging box 100, earphones 210, and mobile phone 310. As shown in FIG. 2, the processor 102 is wirelessly connected to the earphones 210 via the antenna 112 by employing a Bluetooth Low Energy (BLE) communication link and thus can communicate with the earphones 210. When the processor 102 determines that the environment sounds comprise one of the predefined sounds, the processor 102 sends information to the earphones 210. As shown in FIG. 2, the earphones 210 are wirelessly connected to the mobile phone 310 via another type of Bluetooth (BT) communication link.

Figure 3:
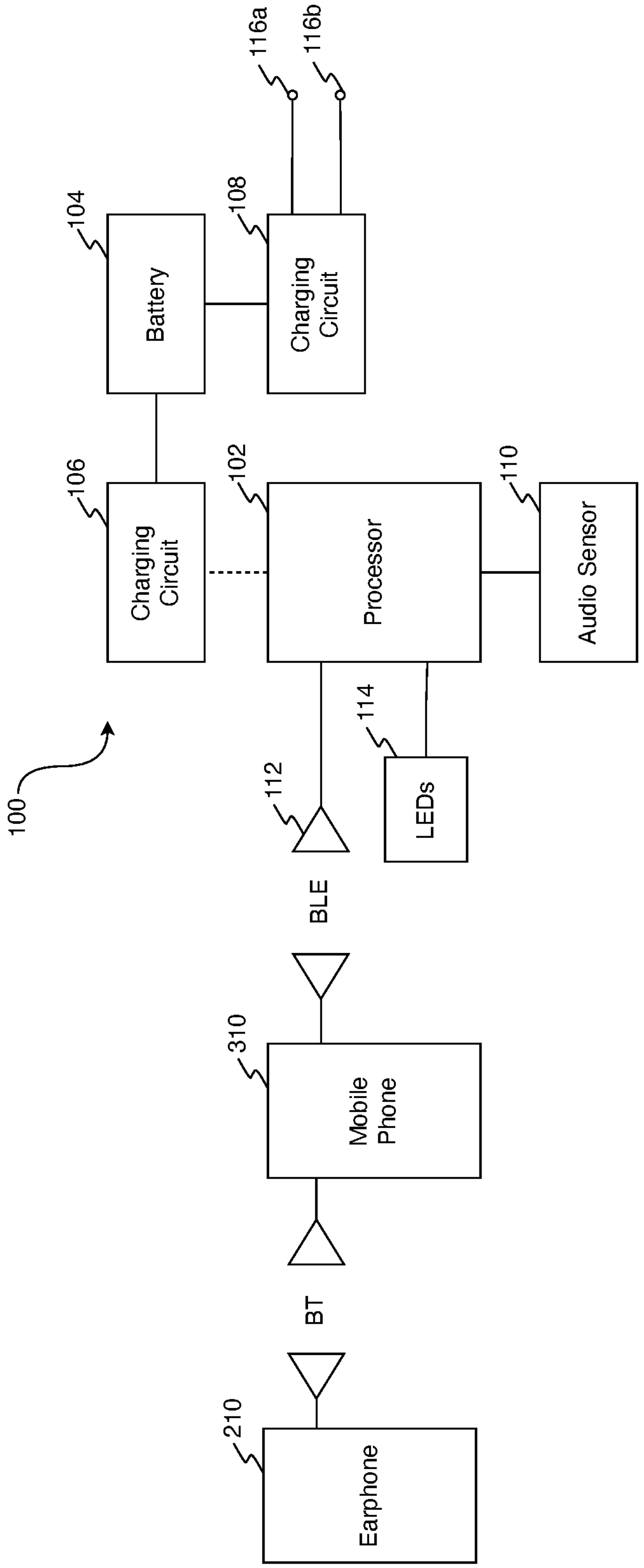
FIG. 3 shows another embodiment of the connection between the charging box of the present disclosure and earphones and mobile phone according to one embodiment of the present disclosure.

FIG. 3 shows another embodiment of the connection between the charging box 100, the earphones 210, and the mobile phone 310. As shown in FIG. 3, the processor 102 is wirelessly connected to the mobile phone 310 via the antenna 112 by employing the BLE communication link and thus can communicate with the mobile phone 310. The mobile phone 310 is in turn wirelessly connected to the earphones 210 via another type of BT communication link. When the processor 102 determines that the environment sound comprises one of the predefined sounds, the processor 102 will send information to the mobile phone 310, which in turn sends the information to the earphones 210.

Figure 4:
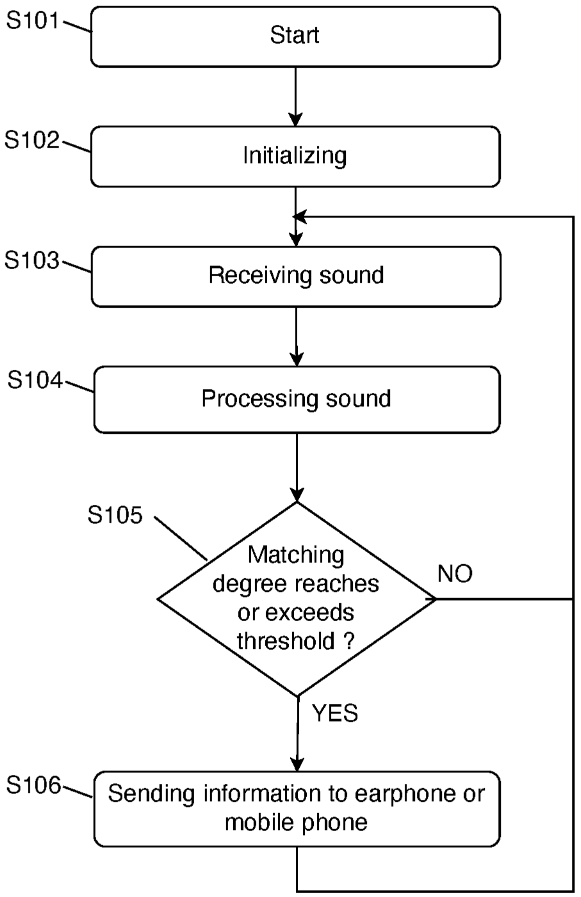
FIG. 4 is a flowchart illustrating an example determination process for determining an existence of predefined sounds in the environment according to one embodiment of the present disclosure.

FIG. 4 is an example determination process illustrating how the charging box 100 determines the existence of a predefined sound from among the environment sounds. The process starts at step S101. In some embodiments, the process can be started upon the removal of the earphones 210 from the charging box 100. That is, the process as shown in FIG. 4 will be started when the earphones 210 are removed from the charging box 100, and will be stopped when the earphones 210 are put back into the charging box 100. In other embodiments, the process can be started by other events, such as when the earphones 210 start to play audio, and when the earphones 210 stop playing the audio.

The process then proceeds to initializing step S102, at which the processor 102 performs one or more initializing processes, such as setting up one or more predefined sounds for the process and a threshold for a matching degree. The predefined sounds can be set up by, for example, reading from a storage device that stores the predefined sounds.

The process then proceeds to step S103, at which the audio sensor 110 senses and receives the environment sounds and generates signals representative of the environment sounds. The processor 102 receives the signals representative of the environment sound from the audio sensor 110.

The process then proceeds to step S104, at which the processor 102 processes the signals representative of the environment sound by performing a natural language processing (NLP) routine, which generates a result indicating the matching degree of the environment sounds to the predefined sounds. The NLP routine is known by one of ordinary skill in the art, and the detailed description thereof is omitted for the sake of brevity.

The process then proceeds to step S105, at which the processor 102 determines whether or not the matching degree generated in S104 reaches or exceeds a predefined threshold. If the matching degree generated in S104 does not reach or exceed the predefined threshold, which means that the environment sounds do not include any sound that has enough similarity with respect to one or more of the predefined sounds, then the process will proceed to S103. If the matching degree generated in S104 does reach or exceed the predefined threshold, which means that the environment sounds do include at least one sound that has enough similarity with one of the predefined sounds, the process will go to step S106.

At S106, the processor 102 sends information to the earphones 210 or mobile phone 310 via the BLE communication link notifying the user that the environment sounds contains at least one of the predefined sounds. Then the process goes back to S103.

Referring to FIG. 2, after the processor 102 sends the information to the earphones 210, the earphones 210 will generate an alert sound, such as a beeping sound, to notify the user of the earphones 210. Referring to FIG. 3, after the processor 102 sends information to the mobile phone 310, which in turn sends information to the earphones 210, the earphones 210 will generate an alert sound, such as the beeping sound, to notify the wearer of the earphones 210. Alternatively, the earphones 210 may generate a voice sound or command indicating the existence of one of the predefined sounds nearby.

As described above, the charging box 100 of the present disclosure includes an audio sensor 110, which can sense and receive the environment sound and generate signals representative of the environment sound. Furthermore, the charging box 100 includes the processor 102 that processes the signals and determines whether the environment sound includes any one of the predefined sounds. When the processor 102 determines that the environment sound includes one or more of the predefined sounds, the processor 102 will send information to the earphones 210, which in turn notifies the user of the earphones 210 the existence of the predefined sounds from among the environment sounds. The charging box 100 of the present disclosure may be employed with wireless in-ear earphones or ANC earphones. As such, the user of the earphones 210 can enjoy music in a relatively noisy environment since the in-ear earphones or ANC earphones can reduce or shield most environment sounds from being heard. Moreover, the user of the earphones 210 will be notified by the earphones 210 of the existence of the predefined sound from among the environmental sounds, such as alert sounds or bell rings, so that the user of the earphones 210 can be aware of specific types of sounds or events in the environment. In addition, since the audio sensor 110 and the process as shown in FIG. 4 is performed by the processor 102 in the charging box 100, rather than a processor of the earphones 210, the battery time of the earphones 210 will not be reduced or inhibited.

In one embodiment, the predefined sounds include, but are not limited to, the sound of a car horn, the sound of a doorbell ringing, etc. For example, when a user walks in the street while wearing earphones 210, the user listens to music and will be notified whenever there is a sound of car horn nearby. For example, when a user is at home while wearing earphones, the user can listen to music and will not miss a doorbell ringing.

When a user wears the earphones, the charging box 100 may sometimes be placed in a bag or a pocket. Since the charging box 100 is in a bag or pocket, the environment sounds received by the audio sensor 110 of the charging box 100 may be unclear due to the bag or packet surrounding the charging box 100. Thus, the earphones 210 may perform a confirmation or double check process after the earphones 210 receives the information from the charging box 100 indicating that the environment sounds includes at least one of the predefined sounds. In addition, the earphones 210 may perform a confirmation or double check process to avoid generating and transmitting incorrect information from the charging box 100.

Figure 5:
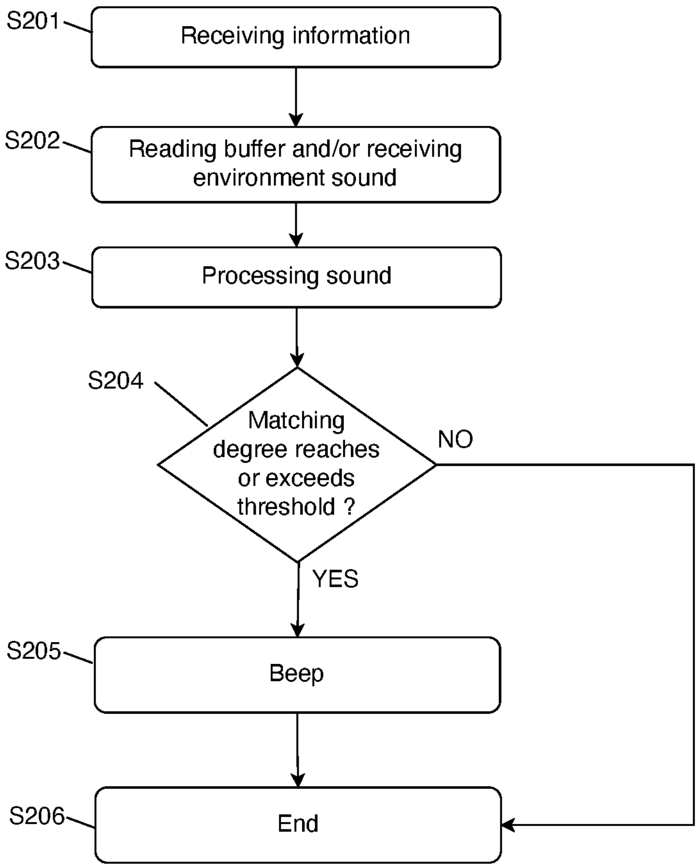
FIG. 5 is a flowchart illustrating an example confirmation or double-checking process of the earphones according to one embodiment of the present disclosure.
Figure 6:
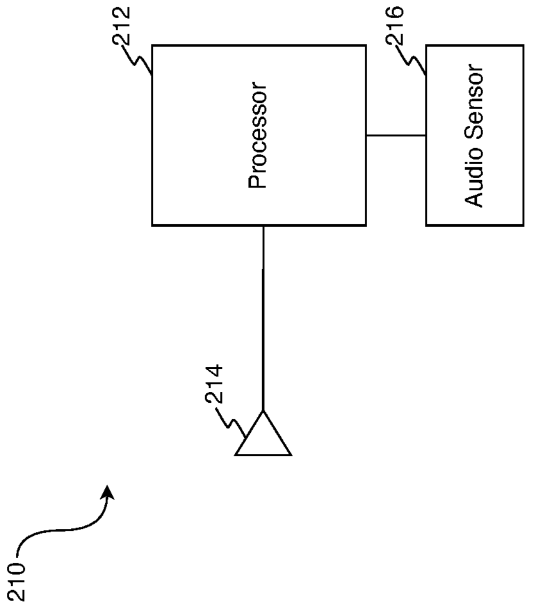
FIG. 6 is a block diagram illustrating the structure of a pair of earphones according to one embodiment of the present disclosure.

FIG. 5 shows an exemplary confirmation or double-checking process of the earphones 210. To perform the double checking-process and with reference to FIGS. 5 and 6, the earphones 210 may include a processor 212, an antenna 214, and an audio sensor 216. The processor 212 may be similar to the processor 102, the antenna 214 is similar to the antenna 112, and the audio sensor 216 is similar to the audio sensor 110. The process starts at step S201. The process is started upon the receipt of the information from the charging box 100 indicating the existence of one or more of the predefined sounds in the environment sounds.

The process then proceeds to step S202, at which the audio sensor 216 of the earphones 210 senses and receives the environment sounds and generates signals representative of the environment sounds. The processor 212 of the earphones 210 receives the signals representative of the environment sound from the audio sensor 216. Alternatively or additionally, the audio sensor 216 of the earphones 210 may sense and receive the environment sound, generate signals representative of the environment sound, and store the latest signal in a buffer. In this embodiment, the processor 212 of the earphones 210 may read the latest signal from the buffer.

The process then proceeds to step S203, at which the processor 212 of the earphones 210 processes the signals representative of the environment sound by employing NLP algorithms, which generate a result indicating the matching degree of the environment sound to the predefined sounds. The NLP algorithm is known in the art, and the detailed description thereof is omitted for the sake of brevity.

The process then proceeds to step S204, at which the processor 202 of the earphones 210 determines whether the matching degree generated in S203 reaches or exceeds a predefined threshold. If the matching degree generated in S203 does not reach or exceed the predefined threshold, which means that the environment sounds do not includes any sound that has enough similarity with one or more of the predefined sounds, the process will proceed to S206, which is the end of the process. If the matching degree generated in S203 does reach or exceed the predefined threshold, which means that the environment sounds do include at least one sound that has enough similarity with one of the predefined sounds, the process proceeds to step S205.

At S205, the earphones 210 will generate an alert sound, such as a beeping sound notifying the user of the earphones that the environment sounds includes at least one of the predefined sounds. Then the process proceeds to S206, which is the end of the process.

In the embodiment shown in FIG. 3, the process shown in FIG. 5 may be performed by the mobile phone 310, e.g., by an audio sensor and a processor in the mobile phone 310, which send information to the earphones 210 and notifies the existence of the predefined sound in the environments if the result of the determination step S204 is YES.

By using the process as shown in FIG. 5, the incorrect information of the existence of the predefined sounds from among the environment sounds can be inhibited or eliminated.

In some embodiments of the present disclosure, the predefined sounds may be sound samples that are pre-stored in a storage device of the earphones 210 by the manufacturer of the charging box 100. In some further embodiments of the present disclosure, the user of the earphones 210 and charging box 100 may select one or more of the pre-stored sounds as the predefined sounds via an application being executed by the mobile phone 310. In some further embodiments of the present disclosure, the user of the charging box 100 may customize the predefined sounds in the charging box 100 via the application being executed by the mobile phone 310, such as downloading sound samples from the internet and transmitting the downloaded sound samples to the charging box 100 as customized predefined sounds.

In the embodiments shown in FIGS. 2 and 3, the charging box 100 of the present disclosure communicates with the earphones 210 or mobile phone 310 via BLE. However, the present disclosure is not limited thereto, and the charging box 100 can communicate with the earphones 210 or mobile phone 310 via other types of wireless technologies, such as classical BT or infrared transmission technology.

In the embodiments shown in FIGS. 4 and 5, a matching degree indicating the closeness of the environment sound relative to the predefined sounds is generated in the processing steps S104, S203, and whether or not the environment sounds include any one of the predefined sounds is determined in step S105, S204. However, the present disclosure is not limited thereto, and the result generated in step S104, S203 may directly indicate whether or not the environment sounds include any of the predefined sounds.

In one embodiment, the processor of the present disclosure is a system on chip (SoC) that employs BLE communication. However, the present disclosure is not limited thereto, and the processor can be provided by other types of processors, such as an application-specific integrated circuit (ASIC), a digital signal processor (DSP), a central processing unit (CPU), a graphics processing unit (GPU), or a field-programmable gate array (FPGA). As shown, the charging box 100 according to some embodiments of the present disclosure includes an audio sensor, however, the present disclosure is not limited thereto and can include any appropriate audio sensor, such as a microphone or other types of sensors that sense the environment sounds and provide signals representative of the environment sounds.

Systems and methods have been described in general terms as an aid to understanding details of the disclosure. In some instances, well-known structures, materials, and/or operations have not been specifically shown or described in detail to avoid obscuring aspects of the disclosure. In other instances, specific details have been given to provide a thorough understanding of the disclosure. One skilled in the relevant art will recognize that the disclosure may be embodied in other specific forms, for example, to adapt to a particular system or apparatus or situation or material or component, without departing from the spirit or characteristics thereof. Therefore, the disclosures and descriptions herein are intended to be illustrative, but not limiting, of the scope of the disclosure. Accordingly, the disclosure is not to be restricted except in light of the attached claims and their equivalents.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A charging box kit, comprising:
a charging box; and
a pair of wireless earphones configured to be provided in the charging box, wherein the charging box comprises:
a battery;
a plurality of contacts configured to be in contact with the wireless earphones when the wireless earphones are provided in the charging box;
a charging circuit configured to electrically couple the battery to the plurality of contacts for charging the wireless earphones;
an audio sensor configured to sense environment sounds and provide signals representative of the environment sounds; and
a processor configured to receive and process the signals, send information to the wireless earphones based on the processor determining that the environment sounds include one or more predefined sounds, and to notify a wearer of the wireless earphones an existence of the one or more predefined sounds in the environment sounds, wherein the determination is made in response to a matching degree reaching or exceeding a threshold,
wherein the pair of wireless earphones comprises:
a second audio sensor configured to sense the environment sounds and provide second signals representative of the environment sounds; and
a second processor configured to receive and process the second signals upon receipt of the information from the charging box, and the wireless earphones are configured to generate an alert sound when the second processor of the wireless earphones determines that the environment sounds includes the one or more predefined sounds,
wherein the wireless earphones are configured to:
receive environment sounds and generate signals representative of the environment sounds by using the audio sensor in the wireless earphones after the receipt of the information from the charging box; and
receive and process the signals representative of the environment sounds generated by the audio sensor in the wireless earphones by using the processor in the wireless earphones, and confirm or double-check whether the one or more predefined sounds exists in the environment sounds received by the audio sensor in the wireless earphones.

2. The charging box kit of claim 1, wherein the one or more predefined sounds are selected from a group consisting of sound of a car horn sound, a doorbell ringing sound, an alarm sound, and a beeping sound.

3. The charging box kit of claim 1, wherein the charging box further comprises a Bluetooth communication interface, and wherein the information is sent to the wireless earphones via the Bluetooth communication interface.

4. The charging box kit of claim 1, wherein the processor is configured to perform a Natural Language Processing algorithm to determine whether the environment sounds include the one or more predefined sounds.

5. The charging box kit of claim 1, wherein the processor is a system on chip (SoC)-type processor including a Bluetooth low energy interface.

6. The charging box kit of claim 1, wherein the one or more predefined sounds are sound samples that are prestored in the charging box.

7. The charging box kit of claim 1, wherein the processor sends the information to a mobile phone, and in response to receiving the information, the mobile phone sends the information to the wireless earphones.

8. The charging box kit of claim 1, wherein the pair of wireless earphones are in-ear earphones or automatic noise cancelling earphones.

9. The charging box kit of claim 1, wherein the wireless earphones are configured to generate an alert sound in response to receiving the information from the charging box.

10. The charging box of claim 1, wherein the signals are processed by performing a natural language processing routine, and wherein the processed signals are indicative of the matching degree of the environment sounds to the predefined sounds.

11. A method for notifying a user of earphones, the method comprising:
receiving, using an audio sensor of a charging box, environment sounds and generating signals representative of the environment sounds;
receiving and processing, the signals representative of the environment sounds;
sending information to the earphones based on determining that the environment sounds contains one or more predefined sounds, wherein the determination is made in response to a matching degree reaching or exceeding a threshold;
generating a voice command in the earphones that notifies the user of the earphones of an existence of the one or more predefined sounds from among the environment sounds;
receiving the environment sounds and generating signals representative of the environment sounds by using a second audio sensor of the earphones after a receipt of the information from the charging box; and
receiving and processing the signals representative of the environment sounds by using a second processor of the earphones, and confirming whether the one or more predefined sounds exists in the environment sounds received by the audio sensor in the earphones.

12. The method of claim 11, wherein the processed signals are indicative of the matching degree of the environment sounds to the one or more predefined sounds.

13. The method of claim 11, wherein the one or more predefined sounds are selected from a group consisting of sound of a car horn sound, a doorbell ringing sound, an alarm sound, and a beeping sound.

14. The method of claim 11, further comprising:
performing a Natural Language Processing algorithm to determine whether the environment sound includes the one or more predefined sounds.

15. The method of claim 11, wherein the one or more predefined sounds are sound samples that are pre-stored in the charging box.

16. The method of claim 11, further comprising:
generating an alert sound in response to receiving the information from the charging box.

17. One or more non-transitory computer-readable media storing processor-executable instructions that, when executed by at least one processor, cause the at least one processor to:
receive environment sounds and generate signals representative of the environment sounds;

receive and process the signals representative of the environment sounds;

send information to earphones based on determining that the environment sounds contains one or more predefined sounds, wherein the determination is made in response to a matching degree reaching or exceeding a threshold;

generate a voice command in the earphones that notifies a user of the earphones of an existence of the one or more predefined sounds from among the environment sounds;

receive the environment sounds and generating signals representative of the environment sounds after a receipt of the information; and receive and process the signals representative of the environment sounds by using a second processor of the earphones, and confirming whether the one or more predefined sounds exists in the environment sounds.

* * * * *